United States Patent
Beier et al.

(10) Patent No.: US 10,698,883 B2
(45) Date of Patent: *Jun. 30, 2020

(54) DATA COHERENCY BETWEEN TRUSTED DBMS AND UNTRUSTED DBMS

(71) Applicant: International Business Machines Corporation, Armonk, NY (US)

(72) Inventors: Felix Beier, Holzgerlingen (DE); Nicole Finnie, Boeblingen (DE); Namik Hrle, Boeblingen (DE); Einar Lueck, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 290 days.

This patent is subject to a terminal disclaimer.

(21) Appl. No.: 15/792,848

(22) Filed: Oct. 25, 2017

(65) Prior Publication Data
US 2019/0121887 A1    Apr. 25, 2019

(51) Int. Cl.
| G06F 16/23 | (2019.01) |
| H04L 29/06 | (2006.01) |
| G06F 16/22 | (2019.01) |
| G06F 21/62 | (2013.01) |

(52) U.S. Cl.
CPC ........ G06F 16/2365 (2019.01); G06F 16/221 (2019.01); G06F 16/2219 (2019.01); G06F 16/2291 (2019.01); G06F 21/6227 (2013.01); H04L 63/045 (2013.01)

(58) Field of Classification Search
CPC .............. G06F 16/2365; G06F 16/221; G06F 16/2291; G06F 16/2219; G06F 21/6227; G06F 21/6236; H04L 63/045
See application file for complete search history.

(56) References Cited

U.S. PATENT DOCUMENTS

| 6,457,007 B1 | 9/2002 | Kikuchi et al. |
| 9,081,978 B1 * | 7/2015 | Connolly ............... G06F 21/62 |
| 9,209,971 B2 | 12/2015 | Sathaye et al. |

(Continued)

OTHER PUBLICATIONS

Ferretti, Luca, Michele Colajanni, and Mirco Marchetti. "Distributed, concurrent, and independent access to encrypted cloud databases." IEEE transactions on parallel and distributed systems 25, No. 2 (2013): 437-446. (Year: 2013).*

(Continued)

*Primary Examiner* — Jesse P Frumkin
(74) *Attorney, Agent, or Firm* — Cantor Colburn LLP; Richard Wilhelm

(57) ABSTRACT

The present disclosure relates to a method for processing data in a database engine. The method includes storing a first instance of a first table in the database engine in plaintext. Encryption information about encryption methods and encryption keys of at least one predefined column of the first table may be maintained. In response to data changes in the column, first log entries for the data changes may be written in plaintext. The data changes may be encrypted by an encryption component using the encryption information. This results in encrypted data changes. Second log entries for the encrypted data changes may be written and applied to a second instance of the first table. The second instance of the first table is stored at a further database engine.

19 Claims, 4 Drawing Sheets

(56) References Cited

U.S. PATENT DOCUMENTS

| | | |
|---|---|---|
| 9,652,346 B2 | 5/2017 | Wall et al. |
| 2004/0243816 A1 | 12/2004 | Hacigumus et al. |
| 2005/0147240 A1 | 7/2005 | Agrawal et al. |
| 2006/0236104 A1 | 10/2006 | Wong et al. |
| 2007/0079386 A1 | 4/2007 | Metzger et al. |
| 2008/0133935 A1 | 6/2008 | Elovici et al. |
| 2008/0281784 A1 | 11/2008 | Zane et al. |
| 2009/0046862 A1 | 2/2009 | Ito et al. |
| 2010/0169665 A1 | 7/2010 | Kang et al. |
| 2010/0211800 A1 | 8/2010 | La Rocca et al. |
| 2011/0208695 A1 | 8/2011 | Anand et al. |
| 2012/0284529 A1 | 11/2012 | Crowe |
| 2012/0323884 A1 | 12/2012 | Draese et al. |
| 2013/0191650 A1 | 7/2013 | Balakrishnan et al. |
| 2014/0281512 A1 | 9/2014 | Arasu et al. |
| 2015/0033032 A1 | 1/2015 | Furukawa |
| 2015/0058629 A1* | 2/2015 | Yarvis ............... H04L 63/061 713/171 |
| 2015/0074041 A1 | 3/2015 | Bhattacharjee et al. |
| 2015/0178506 A1* | 6/2015 | Elovici ............... G06F 21/602 713/189 |
| 2015/0295716 A1 | 10/2015 | Liu |
| 2015/0317483 A1 | 11/2015 | Mori |
| 2016/0125141 A1 | 5/2016 | Raisaro et al. |
| 2016/0132692 A1 | 5/2016 | Kerschbaum et al. |
| 2016/0232362 A1 | 8/2016 | Conway |
| 2016/0292206 A1 | 10/2016 | Valezquez et al. |
| 2016/0328566 A1* | 11/2016 | Nellamakkada ...... G06F 16/254 |
| 2017/0099262 A1 | 4/2017 | Kerschbaum |
| 2017/0103228 A1* | 4/2017 | Yavuz ............... G06F 21/606 |
| 2018/0357427 A1 | 12/2018 | Lindell et al. |
| 2019/0272381 A1 | 9/2019 | Yoon |

OTHER PUBLICATIONS

Beier. et al. "Data Coherency Between Trusted DBMS and Untrusted DBMS" U.S. Appl. No. 16/408,568, filed May 10, 2019.

List of IBM Patents or Patent Applications Treated as Related; Date May 10, 2019 2 pages.

IBM DB2 Analytics Accelerator for z/OS, Version 5.1.0, Incremental Updates, retrieved from the internet: http://www.ibm.com/support/knowledgecenter/SS4LQ8_5.1.0/com.ibm.datatools.aqt.doc/installmanual/topics/tp_idaa_inst_incr_updt.html, Jul. 26, 2017, 4 pages.

List of IBM Patents or Patent Applications Treated as Related, Oct. 25, 2017, 2 pages.

Programming for the instrumentation facility interface (IFI), retrieved from the internet: https://www.ibm.com/support/knowledgecenter/SSEPEK_10.0.0/perf/src/tpc/db2z_program4ifi.html, Jul. 26, 2017, 4 pages.

U.S. Appl. No. 15/792,843, filed Oct. 25, 2017, Entitled: Transparent Analytical Query Accelerator Over Encrypted Data, First Named Inventor: Felix Beier.

A. Boldyreva, et al., Order-Preserving Symmetric Encryption, Jun. 10, 2009, 24 pages.

Beier et al., "Transparent Analytical Query Accelerator Over Encrypted Data," U.S. Appl. No. 16/409,920, filed May 13, 2019.

CryptDB, retrieved from the internet: http://css.csail.mit.edu/cryptdb/, Jul. 26, 2017, 3 pages.

Deterministic Encryption—Wikipedia, retrieved from the internet: https://en.wikipedia.org/wiki/Deterministic_encryption, Jul. 27, 2017, 3 pages.

Hildenbrand, et al., "Query processing on encrypted data in the cloud by." Technical report 735 (2011) (Year: 2011), 14 pages.

IBM DB2 Analytics Accelerator for z/OS, Version 4.1.0, Achiving partition or table data with the High-Performance Storage Saver, retrieved from the internet: https://www.ibm.com/support/knowledgecenter/SS4LQ8_4.1.0/com.i, Jul. 27, 2017, 7 pages.

List of IBM Patents or Patent Applications Treated as Related; Date Filed Aug. 14, 2019, 2 pages.

Microsoft, SQL Server Encryption, retrieved from the internet: https://msdn.microsoft.com/en-GB/library/mt163865.aspx, Jul. 25, 2017, 166 pages.

Probabilistic Encryption—Wikipedia, retrieved from the internet: https://en.wikipedia.org/wiki/Probabilistic_encryption, Jul. 27, 2017, 2 pages.

R. Agrawal, et al., Order Preserving Encryption for Numeric Data, SIGMOD Jun. 2004, 12 pages.

R. Popa et al., CryptDB: Protecting Confidentiality with Encrypted Query Processing, SOSP Oct. 2011, 16 pages.

SAP SEEED, Apr. 16, 2014, 19 pages.

Tu, et al., "Processing analytical queries over encrypted data" Proceedings of the VLDB Endowment. vol. 6. No. 5. VLDB eNDOWMENT, 2013. (Year: 2013), 12 pages.

List of IBM Patents or Patent Applications Treated as Related, Oct. 15, 2019, 2 pages.

U.S. Appl. No. 16/598,077, filed Oct. 10, 2019, Entitled: Transparent Analytical Query Accelerator Over Encrypted Data, First Named Inventor: Felix Beier.

Wang, Haixun, et al. "Dual encryption for quyery integrity assurance." Proceedings of the 17th ACM conference on Information and knowledge management. ACM, 2008. (Year: 2008), 10 pages.

Hacigumus, et al., "Executing SQL over encrypted data in the database-service-provider model," Proceedings of the 2002 ACM SIGMOD international conference on Management of data, ACM, 2002 (Year: 2002), 12 pages.

* cited by examiner

DATA COHERENCY BETWEEN TRUSTED DBMS AND UNTRUSTED DBMS

BACKGROUND

The present invention relates to the field of digital computer systems, and more specifically, to a method for processing data in a database engine.

Hosting data in public clouds may facilitate data sharing among multiple parties and reduce the maintenance costs of hosting servers in house. And, many users demand that sensitive data be accessible in a secure manner. However, due to the constant and rapid increase of the sensitive data volume, for securing access to the data and achieving nearly real-time database operations on the data, there is a need to keep the data coherent among all DBMSs of the cloud.

SUMMARY

Various embodiments provide a method for processing data in a database engine, a computer program product and a database engine as described by the subject matter of the independent claims. Advantageous embodiments are described in the dependent claims. Embodiments of the present invention can be freely combined with each other if they are not mutually exclusive.

In one aspect, the invention relates to a method for processing data in a database engine. The method includes storing a first instance of a first table in the database engine in plaintext, maintaining encryption information about encryption methods and encryption keys of at least one predefined column of the first table, in response to data changes in the column, writing first log entries for the data changes in plaintext, encrypting the data changes by an encryption component using the encryption information, resulting in encrypted data changes, and writing second log entries for the encrypted data changes and applying them to a second instance of the first table, the second instance of the first table being at a further database engine.

In another aspect, the invention relates to a computer program product includes a computer-readable storage medium having computer-readable program code embodied therewith, the computer-readable program code configured to implement all of steps of the method according to preceding embodiments.

In another aspect, the invention relates to a database engine for processing data. The database engine includes a query engine configured to store a first instance of a first table in the database engine in plaintext, and maintain encryption information about encryption methods and encryption keys of at least one predefined column of the first table. An encryption component is configured to perform in response to data changes in the column, encrypting the data changes using the encryption information, resulting in encrypted data changes. A log writer writes first log entries for the data changes in plaintext and writes second log entries for the encrypted data changes for applying to a second instance of the first table, the second instance of the first table being in a further database engine.

BRIEF DESCRIPTION OF THE DRAWINGS

In the following embodiments of the invention are explained in greater detail, by way of example only, making reference to the drawings in which.

DETAILED DESCRIPTION

Figure 1:
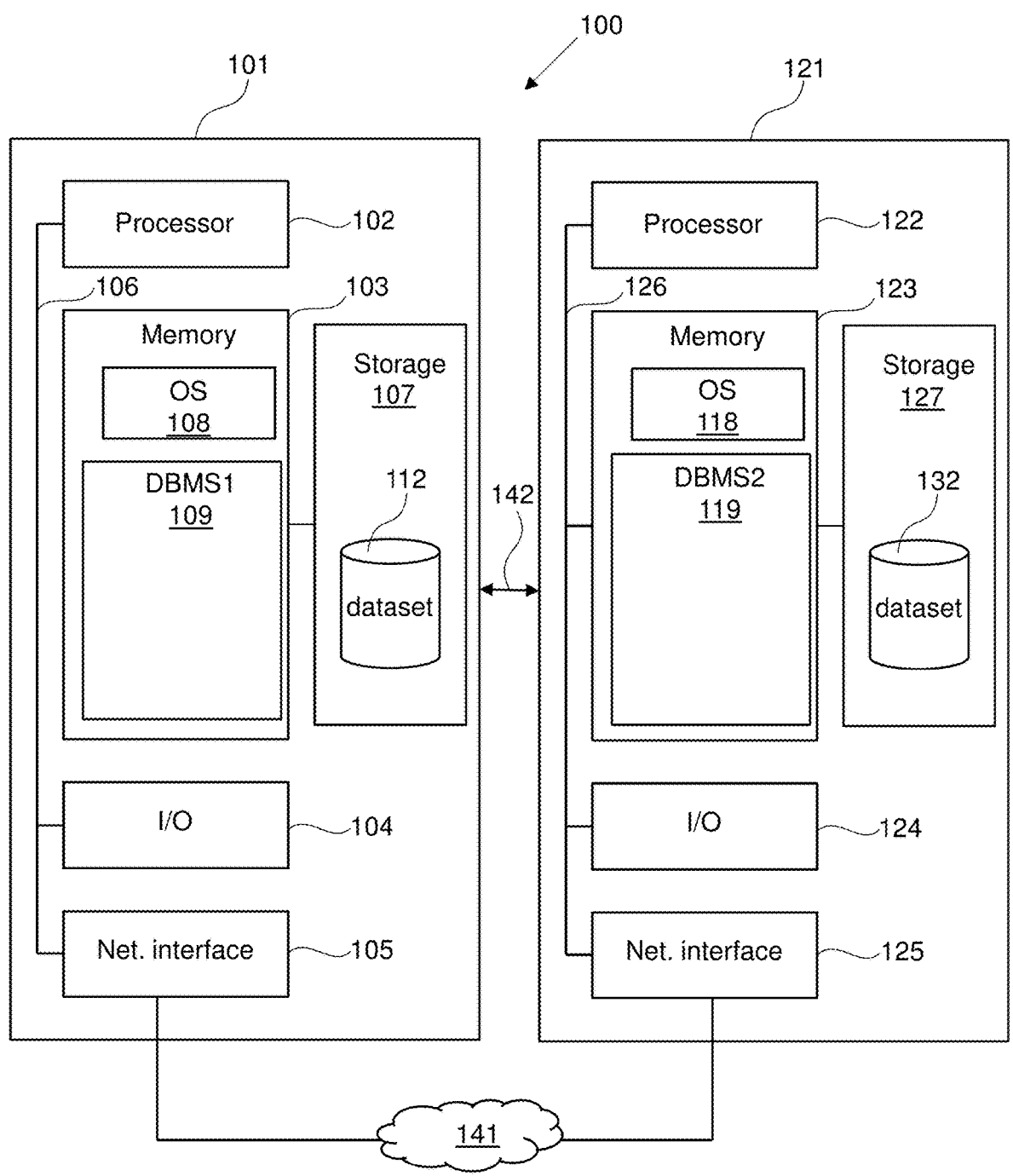
FIG. 1 depicts a data processing system according to an example of the present disclosure.

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The database engine and the further database engine may be part of a database system which may be a hybrid database management system (DBMS) or may implement a hybrid DBMS. In order to address a multitude of workload types with different requirements and goals, the database system is composed from more than one execution engine (the database engine and the further database engine) such that each of the execution or database engines may have a respective set of resources adapted to run on the datasets available at execution engine. For example, the database engine may be a transactional engine that may require less resources compared to the further database engine (e.g., an analytical engine) as its data may be smaller in size.

The DBMS of the database engine may be a trusted DBMS and the DBMS of the further database engine may be an untrusted DBMS.

"Data is stored in a DBMS" means that the DBMS controls access and can access to said data, where said data is stored in a storage device of the computer system that comprises or implements the DBMS.

The term "data table" or "table" as used herein refers to a collection of data that may be presented in tabular form. Each column in the data table may represent a particular variable or attribute. Each row in the data table may represent a given member, record or entry of the data table.

The term "trusted engine" refers to an engine that fulfils one or more predefined security criteria. An untrusted engine may be an engine that does not fulfil at least one of the predefined security criteria. The trusted engine may for example comprise an access control component that controls access to data of the trusted engine such that only authorized users can access the data, e.g., the authorized users may use login information that are accepted by the trusted engine. The trusted engine may implement a DBMS, and the DBMS may be referred to as a trusted DBMS.

The present method may enable an efficient and transparent method for achieving data coherency in a hybrid cloud comprising multiple DBMSs. The present method may enable a federated approach for loading table data and triggering incremental updates for updating data from the unencrypted form in a trusted DBMS (e.g., of the database engine) to the data in the encrypted form in at least one untrusted DBMS (e.g., of the further database engine) of a distributed system consisting of at least one trusted DBMS and one or multiple untrusted DBMSs.

The data of the trusted DBMS may constantly be updated and stored in the unencrypted form in file systems and in memory. In contrast, the data of the untrusted DBMS may be stored in the encrypted form in file systems and in memory. The present may allow real-time query result coherency between trusted clients to trusted DBMSs or untrusted DBMSs, encrypted or unencrypted data, regardless of where the queries are performed. This approach may be transparent to users.

The present method may benefit from the ability of a native query engine of a DBMS of the database engine and may improve encryption performance.

The present method may avoid the technical constraints that may be present when modifying the existing replication engines, as the present method may enable to replicate data from the unencrypted form to the encrypted form in the same framework without modifying a replication engine of the database engine.

According to one embodiment, the database engine comprises a table loader configured for receiving a request indicating a table and to transfer the table to the further database engine, wherein applying the encrypted data changes comprises sending a request to the table loader, the request indicating a temporary table comprising the encrypted data changes. This embodiment may seamlessly be integrated with existing DBMS as the table loader may be maintained unchanged. This embodiment may be transparent to table loaders because it may not change the algorithm of unloading and loading table data. The present method for loading table data may be transparent to native table loaders to the trusted DBMS and the untrusted DBMSs. Table loaders may not need to change the (un)loading algorithm: a temporary table may be created and populated with encrypted data. The temporary table creation and encryption steps may be delegated to the query engine so encryption performance can benefit from native DBMS abilities of the trusted DBMS.

According to one embodiment, the encrypting being performed by a component that is plug-in to the database engine. Encryption steps may be done by the plug-in component, which may be a UDF or a stored procedure, without the trusted DBMS being modified. This approach may benefit from the native ability of the trusted DBMS for performing UDF calls. Encryption steps may thus be more efficient.

According to one embodiment, the storing of the first instance of the first table comprises creating a temporary table, encrypting data of the first table, resulting in encrypted data, storing, the encrypted data in the temporary table, loading the content of the temporary table into the second instance of the first table and deleting the temporary table after the loading of the encrypted data. This embodiment may simplify loading encrypted table data from the database engine.

According to one embodiment, the method further comprises locking the first table for preventing changes to the first table before creating the temporary table and unlocking the first table after loading the encrypted data into the further database engine. Locking the first table may prevent changes to the first table while the temporary table is loaded to the second instance.

These embodiments may enable an efficient transfer of data that keeps consistent copies between the trusted and untrusted DBMSs. For example, these embodiments may prevent changes to occur on source data while data being transferred.

According to one embodiment, before writing the second log entries regularly reading the first log entries and in response to identifying first log entries of the data changes, performing the encrypting of the data changes and the writing of the second log entries.

According to one embodiment, the applying of the encrypted data changes comprises: regularly reading the second log entries and in response to identifying second log entries of the encrypted data changes applying the encrypted data changes.

These embodiments may enable an efficient and systematic method for updating data on the further database engine.

According to one embodiment, the database engine is configured for performing online transaction processing (OLTP) processes, wherein the further database engine is configured for performing online analytical processing (OLAP) processes. This embodiment may seamlessly be integrated in existing data warehouse systems.

According to one embodiment, the database engine is a trusted engine and the further database engine being an untrusted engine.

According to one embodiment, the maintaining of the encryption information comprises: encrypting the column of the first table by the encryption component resulting in the second instance of the first table, the second instance of the first table containing at least part of the data of the first table in encrypted form; and triggering storing of the second instance of the first table in the further database engine. This may enable an automatic end-to-end solution where table data can be loaded from one source database (e.g., of a trusted DBMS) in the unencrypted form to a target database (e.g., of an untrusted DBMS) in the encrypted form.

According to one embodiment, the method further comprises: receiving a query against the first table in a data processing system including the database engine; determining whether to execute the query in the database engine or the further database engine, the determination involving comparison of the query type with the encryption information of the second instance of the first table; in response to deciding to execute the query in the further database engine, rewriting the query against the second instance of the first table by using at least the encryption information of the second instance. Analytical queries may be computed directly on encrypted data when running the queries on untrusted DBMSs. This may be more advantageous than accessing unencrypted data using trusted DBMS, such as shorter query runtime or lower query costs may be achieved. The present method may further enable to determine the target untrusted DBMS to reroute analytical queries based on encryption algorithms that are used to encrypt data stored in systems having untrusted DBMSs. The untrusted DBMSs may belong to a public cloud.

FIG. 1 is a block diagram for a data processing system 100 for a hybrid DBMS suited for implementing method steps as involved in the disclosure. The data processing system 100 comprises a first computer system 101 (also referred to as first database engine or transactional engine) connected to a second computer system 121 (also referred to as second database engine, analytical engine or accelerator engine). The first computer system 101 may for example comprise an IBM System z. The second computer system 121 may for example comprise Netezza system.

The data processing system 100 may be a distributed system hosted as a hybrid cloud, consisting of the first computer system 101 and one or more second computer system 121, where the first computer system may comprise a trusted on-prem DBMS and the one or more second computer systems may each comprise untrusted DBMS. The second computer systems may be hosted in a public cloud.

First computer system 101 includes processor 102, memory 103, I/O circuitry 104 and network interface 105 coupled together by bus 106.

Processor 102 may represent one or more processors (e.g., microprocessors). The memory 103 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 103 can have a distributed architecture, where various components are situated remote from one another, but can be accessed by the processor 102.

Memory 103 in combination with persistent storage device 107 may be used for local data and instruction storage. Storage device 107 includes one or more persistent storage devices and media controlled by I/O circuitry 104. Storage device 107 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like.

Memory 103 may include one or more separate programs, e.g., database management system DBMS1 109, each of which comprises an ordered listing of executable instructions for implementing logical functions, notably functions involved in embodiments of this invention. The software in memory 103 shall also typically include a suitable operating system (OS) 108. The OS 108 essentially controls the execution of other computer programs for implementing at least part of methods as described herein.

DBMS1 may have access to and/or control of a first dataset 112 stored on storage device 107. The first dataset 112 may for example comprise transaction data that provides real time or near real time transaction data for OLTP analysis such as postings from a manufacturing control system.

Second computer system 121 includes processor 122, memory 123, I/O circuitry 124 and network interface 125 coupled together by bus 126.

Processor 122 may represent one or more processors (e.g., microprocessors). The memory 123 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 123 can have a distributed architecture, where various components are situated remote from one another, but can be accessed by the processor 122.

Memory 123 in combination with persistent storage device 127 of the second computer system 121 may be used for local data and instruction storage. Storage device 127 includes one or more persistent storage devices and media controlled by I/O circuitry 104. Storage device 127 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like.

Memory 123 may include one or more separate programs, e.g., database management system DBMS2 129, each of which comprises an ordered listing of executable instructions for implementing logical functions, notably functions involved in embodiments of this invention. The software in memory 123 shall also typically include a suitable OS 128. The OS 128 essentially controls the execution of other computer programs for implementing at least part of methods as described herein.

DBMS2 may have or control access to a second dataset 132 stored on storage device 127 of the second computer system 121. For example, the second dataset 132 may be obtained by replicating or copying a source dataset such as the first dataset 112 from the first computer system 101 to the second computer system 121. The second dataset 132 may comprise at least part of the attributes of the first dataset 112. For example, the second dataset 132 may comprise for a given attribute more attribute values than attribute values of the given attribute in the first dataset 112.

The second computer system 121 may thus be a target of data of the first computer system 101 in that data of the first computer system 101 may be replicated or copied into the second computer system. FIG. 1 depicts for exemplification purpose only one target computer system (the second computer system 121). However, the first computer system 101 may be connected to multiple target computer systems such as the second computer system 121. Each of the target computer system may comprise a respective untrusted DBMS.

The first and second datasets 112 and 132 may be stored in different format. The formats may differ in encryption, compression, row-oriented vs. column-oriented storage, etc. For example, the first dataset 112 may be in plaintext format and the second dataset 132 may be in an encrypted format.

First computer system 101 and second computer system 121 may be independent computer hardware platforms communicating through a high-speed connection 142 or a network 141 via network interfaces 105, 125. The network 141 may for example comprise a local area network (LAN), a general wide area network (WAN), and/or a public network (e.g., the Internet). Every computer system 101 and 121 may be responsible for managing its own copies of the data.

Although shown in FIG. 1 as separate systems, the first and second computer systems may, in another example, belong to a single system, e.g., sharing a same memory and processor hardware, while each of the first and second computer systems is associated with a respective DBMS and datasets, e.g., the two DBMSs may be stored in the shared memory. In another example, the two database management systems DBMS1 and DBMS2 may form part of a single DBMS that enables communications and method performed by DBMS1 and DBMS2 as described herein.

The data processing system 100 may for example categorize every incoming query and execute it on one of the first and second computer systems. The first computer system 101 may be responsible for efficient lookup in transactional workloads, e.g., OLTP and may for example be optimized for accessing limited amounts of data, e.g., of the first dataset 112. The second computer system 121 may for example be responsible for data scans in the scope of analytical applications e.g., OLAP, which may require to read large amounts of data in a single query.

Figure 2:
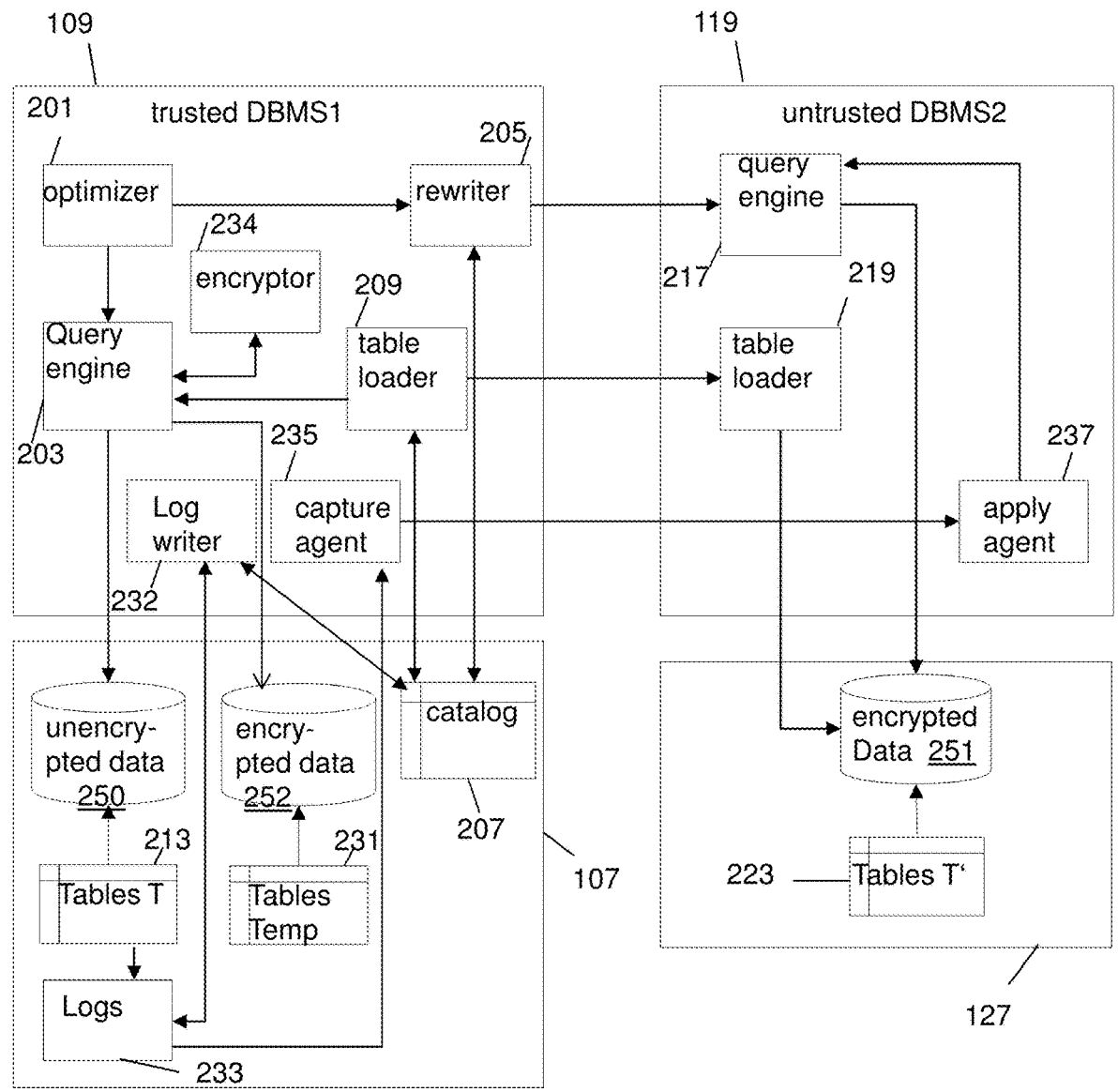
FIG. 2 is a diagram illustrating the components of database management systems of the data processing system.

FIG. 2 is a diagram illustrating the components of the two database management systems DBMS1 and DBMS2 for processing data such as datasets 112 and 132.

DBMS1 109 is referred to as a trusted DBMS1 and DBMS2 119 may be referred to as an untrusted DBMS2. The trusted DBMS 109 comprises a query optimizer 201. The query optimizer 110 may for example be configured for generating or defining query plans for executing queries, e.g., on first dataset 112.

The trusted DBMS1 109 further comprises a query engine 203 for computing or executing queries.

The trusted DBMS1 109 further comprises a rewriter 205 that is configured for rewriting queries (e.g., rewriting queries received at the optimizer 201). For example, a query received by the trusted DBMS1 109 may refer to one or more columns or attributes of the first dataset 112. The rewriter 205 may be configured for rewriting that query such that it refers to other columns (e.g., of the second dataset 132) that correspond to the columns referenced in the received query.

The trusted DBMS1 109 may further comprise a table loader 209. The rewriter 205 and table loader 209 may be configured to access a catalog 207, e.g., which is part of storage 107. The catalog 207 may for example be a persistent storage where table metadata (e.g., including encryption keys) are stored. This storage may be implemented as tables that can be accessed by the trusted DBMS1 109. The table metadata may be descriptive of the tables 213 (e.g., of the first dataset 112). For example, the metadata may indicate the encryptions keys that can be used to encrypt a given column of the tables 213. The metadata is further described with reference to FIG. 3A.

The table loader 209 may for example be configured for generating encryption keys using the table metadata retrieved from the catalog 207, if the keys don't exist yet, or it retrieves encryption keys if the keys have been generated before. And it transfers table data from the trusted DBMS1 109 to untrusted DBMS2 119. The table loader 209 may be a pluggable component to the trusted DBMS1 109, implemented as a stored procedure, a user-defined function (UDF), or other programs.

The untrusted DBMS2 119 comprises a query engine 217 that is configured to receive queries from the rewriter 205. The received queries by the query engine 217 may be rewritten queries by the rewriter 205 of the trusted DBMS 109. The untrusted DBMS2 119 further comprises a table loader 219. The table loader 219 of the untrusted DBMS2 119 may be configured to receive data to be stored on the untrusted DBMS 119 from the table loader 209 of the trusted DBMS1 109. The received data by the table loader 219 of the untrusted DBMS2 119 may be in an encrypted format as indicated in FIG. 2 and may be stored in tables 223 whose columns correspond to at least part of the columns of the tables 213 that are encrypted.

The table data of table 213 accessed by the trusted DBMS1 109 may be stored in the unencrypted form storage 250 (e.g., in in file systems and/or memory) as indicated in FIG. 2. Whereas the table data in tables 223 of the untrusted DBMS2 119 may be stored in an encrypted form in storage 251 (e.g., in file systems and/or memory) as indicated in FIG. 2. The decrypted form of the loaded table data in storage 132 accessible by the untrusted DBMS2 119 may be consistent with the table data of the tables 213 of the trusted DBMS1 109 and can be inversely decrypted to the original data.

As described with reference to FIG. 2, table loader 209 of the trusted DBMS1 109 retrieves the table metadata from catalog 207. Encryption steps may be performed by encryptor 234. The encryptor 234 may be a plug-in component, which may be a UDF or a stored procedure. Using a plug-in component may be advantageous as it may prevent modifying the existing DBMS on which the encryption may be performed.

The trusted DBMS1 109 comprises a capture agent 235 and the untrusted DBMS 119 comprises an apply agent 237. The capture and apply agents may be part of a replication engine of the trusted DBMS1. The capture and apply agents may be plug-in components. Using the capture and apply agents data may be replicated between trusted and untrusted DBMSs without modifying either DBMS. For example, a replication engine of IBM DB2 Analytics Accelerator for z/OS may be configured for replicating data between the trusted DBMS1 and untrusted DBMSs. The capture agent 235 may be configured to read the updates of tables T 213 in encrypted format from the logs 233 controlled by trusted DBMS1 109. The read encrypted updates may be passed by the capture agent 235 to the untrusted DBMS2 119, and in response to receiving the encrypted updates the apply agent 237 inserts the encrypted updates into tables T' 223. The logs 233 may comprise entries for updates, wherein the updates are in plaintext and encrypted format.

The trusted DBMS1 109 further comprises an encrypted log writer 232. The encrypted log writer 232 may be configured to periodically read the logs 233 and the metadata from catalog 207 in order to log new entries in encrypted format. The trusted DBMS1 and untrusted DBMS2 may be configured to exchange data using a temporary table 231 as described with reference to FIG. 3B. The temporary tables 231 are stored in encrypted format in storage 252 (e.g., in file systems and/or memory) as indicated in FIG. 2.

Figure 3A:
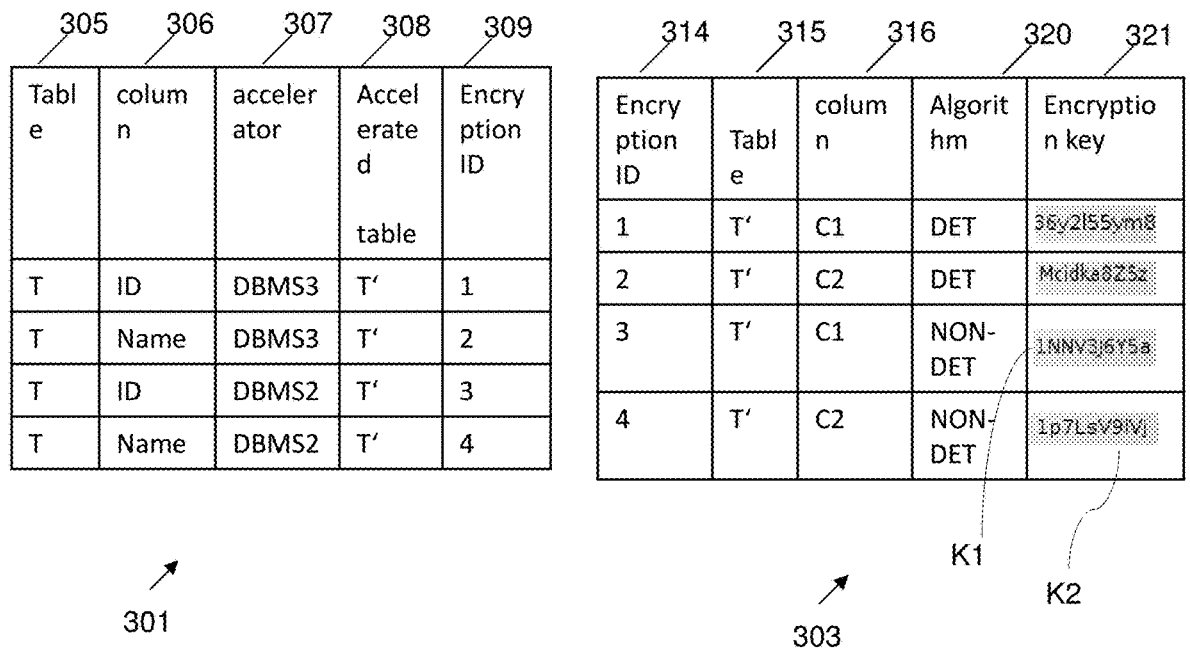
FIG. 3A depicts an example content of table metadata.

FIG. 3A depicts an example content of the table metadata in the catalog 207. The table metadata may for example be stored in data info table 301 and encryption info table 303.

Figure 3B:
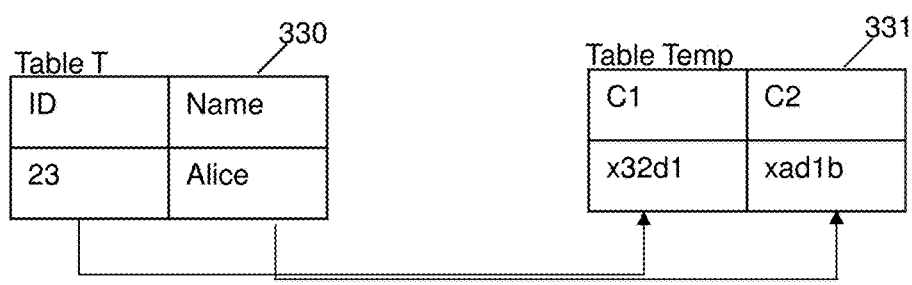
FIG. 3B illustrates the relation between content of tables and temporary tables of the trusted database management systems.

The data info table 301 comprises column "Table" 305 that indicates the table (e.g., table name) that is stored in the storage device 107 of the first computer system 101 and can be accessed by the trusted DBMS1. FIG. 3B shows example content of tables T 330 (of the tables 213) indicated in the data info table 301. In the example of FIGS. 3A-B, the target computer systems where to store the encrypted data comprises two target computer systems having respectively untrusted DBMS2 and DBMS3.

The data info table 301 further comprises column "column" 306 indicating, for a given table of column 305, a column of the given table. For example, column 306 may indicate column names "ID" and "Name" of the corresponding tables.

The data info table 301 further comprises column "Accelerator" 307 having values indicating, for a given table of column 305, a target computer system such as the second computer system 121 on which the values or processed values of the column indicated in column 306 of the given table may be stored or replicated. For example, the values of column 307 may comprise an indication of the database management system of the target computer system on which the corresponding data is to be replicated.

The data info table 301 further comprises column "Accelerated Table" 308 having values indicating, for a given table of column 305, the table of the target computer system on which the values of the column indicated in column 306 of the given table are replicated.

The data info table 301 further comprises column "encryption ID" 309 having values, for a given table of column 305, indicating the encryption ID that can be used to determined details of the encryption that is performed on values of the column indicated in column 306 of the given table.

The encryption IDs of column 309 may be used to access the encryption info table 303 using column 314 of the encryption info table 303. Column 314 comprises values indicating the encryption IDs which may comprise at least encryption IDs of column 309.

The encryption info table 303 further comprises column "Table" 315 having values indicating, for a given encryption ID, the table of the target storage system that comprises the data encrypted of the column indicated in the table info table 301 associated with the given encryption ID is stored.

The encryption info table 303 further comprises column "column" 316 having values indicating, for a given encryption ID, the column on which the data encrypted of the column indicated in the table info table 301 associated with the given encryption ID is stored.

The encryption info table 303 further comprises column "algorithm" 320 having values indicating, for a given encryption ID, the encryption method identified by the given encryption ID.

The encryption info table 303 further comprises column "encryption key" 321 having values indicating, for a given encryption ID, the encryption key used by the encryption method identified by the given encryption ID. The encryption keys 321 are provided for exemplification purpose only and other encryptions keys may be used for each respective encryption algorithm. The encrypted values of tables T' 223 and table Temp 331 are provided for exemplification purpose to illustrate an encrypted content. The encrypted values (e.g., of table Temp 331) may for example be obtained by other encryption keys than the encryption keys 321 in table 303 and are provided to illustrate an encrypted content of the values, e.g., "Alice" and "23".

For example, from the encryption info table 303, table loader 209 of the trusted DBMS1 109 may find the encryption algorithms and encryption keys for columns of the second instances of a table of the trusted DBMS1 that are stored in untrusted DBMSs such as untrusted DBMS2 and DBMS3. Moreover, table loader 209 may check if encryption keys have been generated for a previous table load (e.g., a previous load of values of a column as the one being processed) or need to be generated for the current table load in order to use them for encryption.

For example, the unencrypted column names of the table T managed by the trusted DBMS1 are ID and Name, and their encrypted column names in other instances of table T in the untrusted DBMS2/DBMS3 are C1 and C2 respectively. This obfuscation may be only known to catalog 207 of the trusted DBMS.

C1 and C2 in the untrusted DBMS2 are encrypted using a deterministic encryption algorithm (DET), which may be a less secure encryption mechanism, because the same text may be encrypted into the same ciphertext every time. In contrast, C1 and C2 of untrusted DBMS3 are encrypted using a non-deterministic encryption algorithm (NON-DET), which may be the most secure encryption mechanism—when it encrypts the same text several times, it yields different ciphertext every time.

The reason for using different encrypting algorithms in different untrusted DBMSs may be that one untrusted DBMS is less secure than the other. For example, this may be due to the fact that one untrusted DBMS may be in a private cloud and the other may be in a public cloud.

After table loader 209 encrypts the data of the columns in table T 330 of trusted DBMS1 109, it loads the encrypted data to the tables T' 223 of untrusted DBMS2 and DBMS3. The metadata of the source column (e.g., ID) may differ from that of the target column (e.g., C1). For example, ID is a numeric column but C1 may be a (VAR)CHAR column.

FIG. 3B shows table T 330 of the tables 213 of the trusted DBMS1 as containing two columns ID and Name having example values. The metadata provided by the data info table 301 and encryption info table 303, indicates how each value is to be encrypted using the corresponding one or more encryption algorithms and where to be stored.

For example, the column ID of table T 330 may be encrypted by the DET and algorithm, and the resulting encrypted values are stored in respective column C1 of table T' of the tables 223 of the untrusted DBMS3. The column Name of table T 330 is encrypted by the DET algorithm, and the resulting encrypted values are stored in respective columns C2 of table T' of the untrusted DBMS3. The columns ID and Name of table T 330 are encrypted by the NON-DET algorithm, and the resulting encrypted values are stored in respective columns C1-C2 of table T' of the untrusted DBMS2.

The metadata stored in the data info table 301 and encryption info table 303 enables to maintain encryption information about encryption methods and encryption keys of second instances (e.g., T') of table T of the trusted DBMS1.

The trusted DBMS1 and untrusted DBMS2 may be configured to exchange data using a temporary table as illustrated in FIG. 3B. For example, the trusted DBMS1 may manage data in plaintext format and the untrusted DBMS2 may manage data in encrypted format. In one example, data may be loaded or transferred from the trusted DBMS1 to the untrusted DBMS2 as described by the following set of SQL instructions.

```
Load(T) →
    Lock(T) →
        CREATE TEMPORARY TABLE Temp (SELECT ENC_UDF(ID, K1)
    AS C1, ENC_UDF(Name, K2) AS C2 FROM T) →
        Initialize (Encrypted Log Writer) →
        Load(Temp) →
        Unlock(T) →
        Drop(Temp)
```

When a table load of table T 330 (Load(T)) is triggered, the table T 330 is locked (Lock(T)). The table loader 209 looks up the metadata of the table T 330 and encryption keys K1, K2 from the catalog 207, and issues a Create Temporary Table command against the trusted DBMS1 to create temporary table Temp. ENC_UDF is a UDF implementation of encryptor 234, which encrypts the column value using the corresponding key. The trusted DBMS1 creates a temporary table Temp 331 and populates the temporary table Temp 331 with encrypted values returned by UDF calls.

Once a table load of table Temp 331 is triggered (Load (Temp)), the table loader 209 unloads the table Temp 331 and loads it to the untrusted DBMS. After the table Temp 331 has been loaded in the untrusted DBMS, the table T 330 may be unlocked. Using the metadata in catalog 207, the table loader 209 loads the table data of table Temp 331 to the table T' 223 in untrusted DBMS2. Temporary table Temp 331 may have a predefined (short) life span, and the table Temp 331 may be explicitly dropped as indicated by the command Drop(Temp).

This method may be transparent to the table loaders of the trusted and untrusted DBMSs because it may not change the algorithm of unloading and loading table data. This approach may benefit from the native ability of the DBMS for performing UDF calls such that encryption steps may be more efficient than a method not using the UDF calls. And the temporary table may not take extra storage since it has a short life span.

Figure 4:
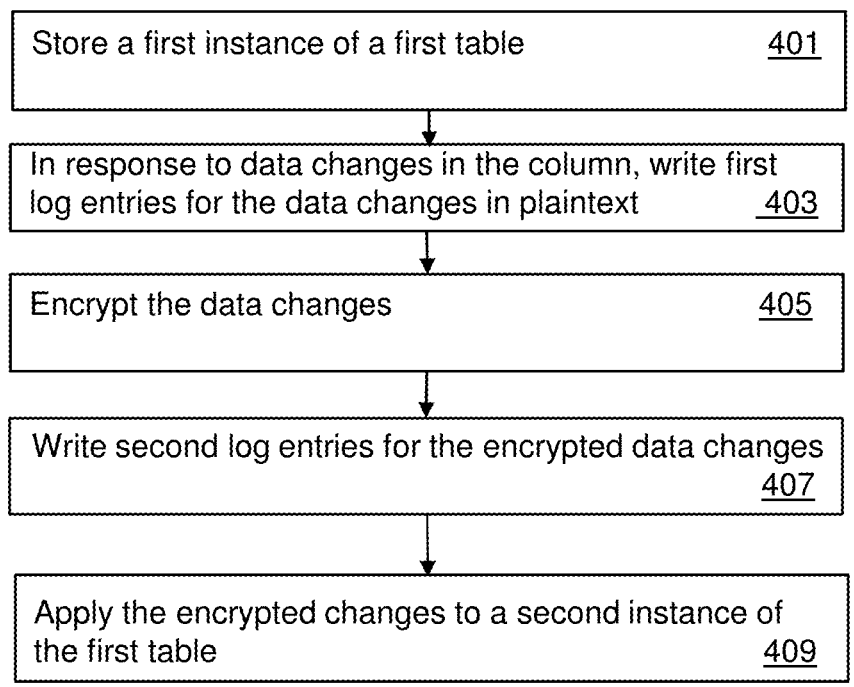
FIG. 4 is a flowchart of a method for processing data in a database engine.

FIG. 4 is a flowchart of a method for processing data in a database engine, e.g., first database engine 109.

In step 401, a first instance of a first table, e.g., first table 330 may be stored in the first database engine 109 in plaintext. The first table 330 may for example be received by the first database engine 109 for storage of the first data table. The first instance of the first table 330 is a copy of the data of the first table that has a given format, e.g., a plaintext or unencrypted format. For example, one or more second instances of the first table 330 may exist and stored on second database engines 119.

In response to identifying or detecting in step 403 data changes in a predefined column of the first table 330, first log entries for the data changes may be written in plaintext, e.g., in logs 233. For example, new values of the columns ID and Name which are added to the first table 330 may be data changes or updates to the first table 330.

In step 405, the data changes may be encrypted by an encryption component, e.g., encryptor 234 using the encryption information as stored in the catalog 207. The encryption information may be associated with the first table 330 and its second instances and may for example be read from tables 301-303 of catalog 207. The encryption information may for example indicate the encryption keys and encryption algorithms that are used for encrypting the content of the first table that is stored in the second instances of the first table. If there are multiple second instances of the first table, step 405 may be repeated for encrypting the data changes using the encryption information associated with each second instance of the first table. This results in encrypted data changes. For example, the new values of the columns ID and Name which are added to the first table 330 may be encrypted using encryption methods and keys that are provided in the table metadata stored in catalog 207 in association with the table T 330.

The method may further comprise: determining if the first table has one or more second instances, e.g., stored on the second database engines, and in response to determining that at least one second instance of the first table exists performing step 405 otherwise if there is no second instances of the first table the data changes may not be encrypted. In step 407, second log entries for the encrypted data changes may be written, e.g., in logs 233. The encrypted changes may be applied in step 409 to a second instance 223 of the first table (e.g., the encrypted changes may be stored on the second instance of the first table). The second instance 223 of the first table 330 is stored at a further database engine such as the second database engine 119. If for example, multiple second instances of the first table exist, the updates may be applied to each second instance of the first table using respective encrypted data changes.

Steps 403-409 may automatically be performed, e.g., on a time periodic basis. In another example, steps 403-409 may be triggered by a replication process that is, e.g., initiated by encrypted log writer 232.

The present method may be described with the following example. The method may be executed by the following SQL instructions.

```
Update(T) →
    Write_Log_Protocol(updates) →
    Read_Log_Protocol(updates) →
    Encrypt(updates) →
        Write_Log_Protocol(encrypted updates) →
```

For example, an update to a column of the first table T 213 may be caused by a client that inserts values into the table T 213. The insertion of values may be performed for example using SQL commands as follows.

```
INSERT INTO TABLE T VALUES (23, 'Bob');
INSERT INTO TABLE T VALUES (24, 'Cathy');
```

The trusted DBMS1 109 may periodically write updates such as the insertions above to logs 233. For example, the trusted DBMS1 writes these updates into logs 233, including for example the time stamp (e.g., indicating the time at which the update occurred), instruction, table name, and values as follows.

```
2017-0101-000000, INSERT, T, 23, 'Bob'
2017-0101-000001, INSERT, T, 24, 'Cathy'
```

The encrypted log writer 232 may periodically read the logs 233 in order to identify or discover new updates on the table T 213. For example, the encrypted log writer 232 may identify that values (23, 'Bob') and (24, 'Cathy') are new updates to the table T 213 since they are newly added since the last time the encrypted log writer 232 has looked up the logs 233. The encrypted log writer 232 may look up the metadata from catalog 207 and retrieve the column encryption keys of the table T 213 (and columns ID and Name) such as K1, K2 from the catalog using the encryption info table 303. Using the retrieved encryption information, the encrypted log writer 232 may encrypt the updated values (23, 'Bob') and (24, 'Cathy'), and write the newly encrypted updates to logs 233 as follows.

```
2017-0101-000000, INSERT, T, x32d1, xad1b
2017-0101-000001, INSERT, T, x1234, x345d
```

A log entry may indicate the timestamp of the updates, the table in which the updates are occurred and the updates. The encrypted values "x32d1", "xad1b", "x1234" and "x345d" are provided for exemplification purpose only to illustrate an encrypted content of values "23", "Bob", "24" and "Cathy". For example, the encrypted log writer 232 may use a log interface to read the updates and write the encrypted updates in a new log buffer to the log interface of the trusted DBMS1.

The encrypted log writer 232 may control the replication process by for example controlling the capture agent 235 to read encrypted updates in the logs 233, e.g., in order to perform a replication if updates exist. The capture agent 235 may be configured to not read the unencrypted updates from the logs 233. The logs 233 may for example comprise one or more files. The logs 233 may logically or virtually be divided or separated into two sub-logs, wherein a sub-log comprises unencrypted updates and the other sub-log contains encrypted updates, wherein the capture agent 235 may be configured to access the sub-log of encrypted updates and may not access the sub-log of unencrypted updates. For example, the entries of the logs 233 associated with the encrypted updates may be indicated in the logs (e.g. the encrypted updates entries may be tagged or flagged) such that the capture agent may be configured to read only the indicated entries of the logs 233, e.g., as they belong to a separate sub-log.

In another example, the capture agent 235 may be configured to periodically and automatically read the content of the logs 233 to identify new encrypted updates.

The capture agent 235 may read the logs 233 from the timestamp right after the last check point, sends the new entries comprising the encrypted updates to the apply agent 237. The apply agent 237 applies the updates to table T' 223 using for example the following SQL commands.

```
INSERT INTO TABLE T' VALUES (x32d1, xad1b);
INSERT INTO TABLE T' VALUES (x1234, x345d);
```

The present method embodiment may be transparent to a replication engine involving the capture and apply agents. For example, there may not be need to modify the replication engine to achieve data coherency between trusted and untrusted DBMSs or between different data formats.

In another example, a method for processing data in a database engine is provided. The method comprises: storing a first instance of a first table in the database engine in plaintext; maintaining encryption information about encryption methods and encryption keys of at least selected columns of the first table; in response to data changes in the selected columns, encrypting the data changes by an encryption component using the encryption information, resulting in encrypted data changes; writing first log entries for the plaintext data changes; and writing second log entries for the encrypted data changes for applying them to a second instance of the first table, the second instance of the first table being in a further database engine.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product comprising a computer-readable storage medium having computer-readable program code embodied therewith, the computer-readable program code configured to be executed by a processor to perform:
   storing, by a database engine, a first instance of a first table in plaintext on a first storage device;
   maintaining encryption information about encryption methods and encryption keys of at least one predefined column of the first table;
   creating encrypted data on the first storage device based on the encryption methods and encryption keys of the at least one predefined column of the first table by creating a temporary table, encrypting data of the first table resulting in the encrypted data, and storing the encrypted data in the temporary table;
   loading the encrypted data of the temporary table into a second instance of the first table on a second storage device using a further database engine, and deleting the temporary table after the loading of the encrypted data;
   in response to data changes in the column, writing first log entries for the data changes in plaintext to the first storage device;
   encrypting the data changes by an encryption component using the encryption information, resulting in creation of encrypted data changes in the temporary table; and
   writing second log entries for the encrypted data changes and applying the encrypted data changes to the second instance of the first table based on the temporary table.

2. The computer program product of claim 1, wherein the database engine comprises a table loader configured to receive a request indicating a table and to transfer the table to the further database engine, wherein applying the encrypted data changes comprises sending a request to the table loader, the request indicating a temporary table comprising the encrypted data changes.

3. The computer program product of claim 1, wherein the processor is configured to execute instructions to lock the first table for preventing changes to the first table before creating the temporary table and unlock the first table after loading of the encrypted data into the further database engine.

4. The computer program product of claim 1, wherein the processor is configured to perform before writing the second log entries regularly reading the first log entries and in response to identifying first log entries of the data changes, performing the encrypting of the data changes and the writing of the second log entries.

5. The computer program product of claim 1, wherein applying the encrypted data changes comprises:
   regularly reading the second log entries and in response to identifying second log entries of the encrypted data changes applying the encrypted data changes.

6. The computer program product of claim 1, wherein the database engine is configured to perform online transaction processing (OLTP) processes, wherein the further database engine is configured for performing online analytical processing (OLAP) processes.

7. The computer program product of claim 1, wherein the database engine is a trusted engine and the further database engine is an untrusted engine.

8. The computer program product of claim 1, wherein maintaining of the encryption information comprises:
   encrypting the column of the first table by the encryption component resulting in the second instance of the first table, the second instance of the first table containing at least part of the data of the first table in encrypted form; and
   triggering storing of the second instance of the first table in the further database engine.

9. The computer program product of claim 8, wherein the processor is configured to perform a plurality of operations comprising:
   receiving a query against the first table in a data processing system including the database engine;
   determining whether to execute the query in the database engine or the further database engine, the determination involving comparison of the query type with the encryption information of the second instance of the first table; and
   in response to deciding to execute the query in the further database engine, rewriting the query against the second instance of the first table by using at least the encryption information of the second instance.

10. A system for processing data, the system comprising:
   a first computer system comprising a first processor and a first storage device, the first processor configured to execute a plurality of instructions to:
      store, by a database engine, a first instance of a first table in the database engine in plaintext on the first storage device; and maintain encryption information about encryption methods and encryption keys of at least one predefined column of the first table;

create encrypted data on the first storage device based on the encryption methods and encryption keys of the at least one predefined column of the first table by creating a temporary table, encrypting data of the first table resulting in the encrypted data, and storing the encrypted data in the temporary table;

in response to data changes in the column, write first log entries for the data changes in plaintext to the first storage device; and encrypt the data changes by an encryption component using the encryption information, resulting in creation of encrypted data changes in the temporary table.

11. The system of claim 10, further comprising:

a second computer system comprising a second processor and a second storage device, the second processor configured to execute a plurality of instructions to:

load the encrypted data of the temporary table into a second instance of the first table on a second storage device of a second computer system using a further database engine, wherein the temporary table is deleted after the loading of the encrypted data; and writing second log entries for the encrypted data changes and applying the encrypted data changes to the second instance of the first table based on the temporary table.

12. The system of claim 11, wherein the database engine comprises a table loader configured to receive a request indicating a table and to transfer the table to the further database engine, wherein applying the encrypted data changes comprises sending a request to the table loader, the request indicating a temporary table comprising the encrypted data changes.

13. The system of claim 11, wherein the first processor is configured to execute instructions to lock the first table for preventing changes to the first table before creating the temporary table and unlock the first table after loading of the encrypted data into the further database engine.

14. The system of claim 11, wherein the system is configured to perform before writing the second log entries regularly reading the first log entries and in response to identifying first log entries of the data changes, performing the encrypting of the data changes and the writing of the second log entries.

15. The system of claim 11, wherein applying the encrypted data changes comprises:

regularly reading the second log entries and in response to identifying second log entries of the encrypted data changes applying the encrypted data changes.

16. The system of claim 11, wherein the database engine is configured to perform online transaction processing (OLTP) processes, wherein the further database engine is configured for performing online analytical processing (OLAP) processes.

17. The system of claim 11, wherein the database engine is a trusted engine and the further database engine is an untrusted engine.

18. The system of claim 11, wherein maintaining of the encryption information comprises:

encrypting the column of the first table by the encryption component resulting in the second instance of the first table, the second instance of the first table containing at least part of the data of the first table in encrypted form; and triggering storing of the second instance of the first table in the further database engine.

19. The system of claim 18, wherein the system is configured to perform a plurality of operations comprising:

receiving a query against the first table in a data processing system including the database engine;

determining whether to execute the query in the database engine or the further database engine, the determination involving comparison of the query type with the encryption information of the second instance of the first table; and in response to deciding to execute the query in the further database engine, rewriting the query against the second instance of the first table by using at least the encryption information of the second instance.

* * * * *